(12) United States Patent
Van Keuren et al.

(10) Patent No.: US 8,768,124 B2
(45) Date of Patent: Jul. 1, 2014

(54) DIRECT COUPLING OF OPTICAL SLOT WAVEGUIDE TO ANOTHER OPTICAL WAVEGUIDE

(75) Inventors: Edward R. Van Keuren, Herndon, VA (US); Changbao Ma, Fairfax, VA (US)

(73) Assignee: Georgetown University, Washington, DC (US)

( * ) Notice: Subject to any disclaimer, the term of this patent is extended or adjusted under 35 U.S.C. 154(b) by 494 days.

(21) Appl. No.: 13/143,260

(22) PCT Filed: Jan. 5, 2010

(86) PCT No.: PCT/US2010/020160
§ 371 (c)(1),
(2), (4) Date: Sep. 13, 2011

(87) PCT Pub. No.: WO2010/078594
PCT Pub. Date: Jul. 8, 2010

(65) Prior Publication Data
US 2011/0317960 A1    Dec. 29, 2011

Related U.S. Application Data

(60) Provisional application No. 61/142,603, filed on Jan. 5, 2009.

(51) Int. Cl.
*G02B 6/26* (2006.01)
*G02B 6/42* (2006.01)

(52) U.S. Cl.
USPC .............. 385/50; 385/39; 385/131; 385/132

(58) Field of Classification Search
None
See application file for complete search history.

(56) References Cited

U.S. PATENT DOCUMENTS

| | | | |
|---|---|---|---|
| 6,293,688 B1* | 9/2001 | Deacon | 362/556 |
| 7,519,257 B2* | 4/2009 | Lipson et al. | 385/126 |
| 2005/0089262 A1* | 4/2005 | Jenkins et al. | 385/14 |
| 2005/0123244 A1* | 6/2005 | Block et al. | 385/43 |
| 2007/0114628 A1* | 5/2007 | Barrios et al. | 257/432 |

OTHER PUBLICATIONS

Anderson, P. A. et al., High confinement in silicon slot waveguide with sharp bends, Optic Express, Oct. 2, 2006, pp. 9197-9202, vol. 14, No. 20.

Ma, Changbao et al., Right-angle slot waveguide bends with high bending efficiency, Optic Express, Sep. 15, 2008, pp. 14330-14334, vol. 16, No. 19.

Dionne, J. A. et al., Highly confined photon transport in subwavelength metallic slot waveguides, Nano Letters, Jul. 27, 2006, pp. 1928-1932, vol. 6, No. 9.

International Search Report for Application No. PCT/US2010/020160, mailed Jun. 30, 2010.

International Preliminary Report on Patentability for Application No. PCT/US2010/020160, mailed Jul. 14, 2011.

Ma, C. et al., Direct integration of nanoscale conventional and slot waveguides, Journal of Nanoscience and Nanotechnology, Mar. 2011, pp. 2524-2527, vol. 11, No. 3.

* cited by examiner

*Primary Examiner* — Uyen Chau N Le
*Assistant Examiner* — Chad Smith
(74) *Attorney, Agent, or Firm* — Kilpatrick, Townsend & Stockton LLP

(57) ABSTRACT

Devices, systems and techniques for directly coupling an optical slot waveguide to another optical waveguide without a taper waveguide region between the two optical waveguides.

28 Claims, 6 Drawing Sheets

DIRECT COUPLING OF OPTICAL SLOT WAVEGUIDE TO ANOTHER OPTICAL WAVEGUIDE

PRIORITY CLAIM AND RELATED PATENT APPLICATION

This patent document claims the benefit of U.S. Provisional Application No. 61/142,603 entitled "DIRECT COUPLING OF OPTICAL SLOT WAVEGUIDE TO ANOTHER OPTICAL WAVEGUIDE" and filed Jan. 5, 2009 which is incorporated by reference in its entirety as part of the disclosure of this document.

STATEMENT REGARDING FEDERALLY FUNDED RESEARCH

This invention was made with government funding under Grant No. DMR 0348955 from the National Science Foundation. The government has certain rights in this invention.

BACKGROUND

This patent document relates to optical waveguides.

Optical waveguides are structures that confine and guide light in one or more optical modes of the optical waveguide. Many optical waveguides are structured to include a continuous waveguide core and a waveguide cladding in contact with the waveguide core with a refractive index less than the waveguide core to guide light. One example of such an optical waveguide is a high-index waveguide core layer formed between two waveguide cladding layers each having a refractive index less than that of the waveguide core. Another example is an elongated waveguide core surrounded or clad by a lower-index waveguide cladding such as an optical fiber.

An optical slot waveguide has a different structure than the above core-cladding structure in that it includes a slot formed in the core with a refractive index less than the core. For example, one example of an optical slot waveguide can include a nanoscale slot layer with a refractive index of $n_S$ sandwiched between two high-index core layers with a refractive index of $n_H$ greater than $n_S$ and two low-index cladding layers each with a refractive index of $n_{C\ less\ than\ nH}$ outside the two high-index core layers, respectively. Such a slot waveguide structure provides a discontinuity of the electric field (e.g., for the transverse magnetic mode or TM mode) at high-index-contrast interface to strongly enhance and confine light in a nanoscale region of the slot layer and can be applied to a variety of optical devices such as microring resonators, directional couplers, optical modulators, optical sensors, light enhancement, all-optical logic gates, and multimode interference waveguides. The emergence of these and other applications for slot waveguides leads to integration of a slot waveguide with an optical waveguide that is not a slot waveguide and may be made of, e.g., a high-index core surrounded by low-index claddings for low loss optical interconnections in single photonic chips and other applications. The coupling structures that can efficiently couple light between a slot waveguide and a non-slot waveguide. Due to the difference in size between the cross section of a slot layer in a slot waveguide and the cross section of another optical waveguide not in the slot waveguide configuration, various coupling designs for slot waveguides with other optical waveguides use a tapered waveguide structure with a sufficient length (e.g., several microns or longer) to provide an adiabatic mode transformation between the mode of the slot waveguide and the mode of the other non-slot waveguide to achieve a high coupling efficiency, e.g., over 99%.

SUMMARY

Examples and implementations of devices, systems and techniques are provided for directly coupling an optical slot waveguide to another optical waveguide without a taper waveguide region between the two optical waveguides.

In one implementation, a method for coupling an optical slot waveguide to an optical waveguide is provided to include providing an optical waveguide that comprises a first waveguide core and a first waveguide cladding in contact with the first waveguide core to guide light along a waveguide direction, and providing an optical slot waveguide that comprises a second waveguide core and a second waveguide cladding that are respectively identical to the first waveguide core and the first waveguide cladding of the optical waveguide in material composition and in structure, and a waveguide slot that is formed in the waveguide core and made of a waveguide slot dielectric material having a refractive index less than a refractive index of the second waveguide core. The waveguide slot is elongated along the waveguide direction to have a dimension of less than one wavelength of the guided light along a direction perpendicular to the waveguide direction. The optical slot waveguide and the optical waveguide are concatenated in series to be in contact with each other so that a terminal end of the waveguide slot in the optical slot waveguide is in contact with an end facet of the waveguide core of the optical waveguide to couple light without a tapered waveguide section between the optical waveguide and the optical slot waveguide while the first waveguide core and the first waveguide cladding of the optical waveguide mate with the second waveguide core and the second waveguide cladding of the optical slot waveguide, respectively.

In another implementation, an optical waveguide device is provided to include a waveguide core made of a first dielectric material which has a first refractive index; and a waveguide cladding in contact with at least two opposite sides of the waveguide core. The waveguide cladding is structured to (1) have each waveguide cladding part, which is in contact with the waveguide core, made of a dielectric material with a refractive index less than the first refractive index, and (2) form an optical waveguide with the waveguide core to guide light along a waveguide direction of the optical waveguide. The waveguide core includes a portion that is shaped to include a waveguide slot, which is made of a second dielectric material having a second refractive index less than the first refractive index of the waveguide core and is elongated along the waveguide direction to have a dimension of less than one wavelength of the guided light along a direction perpendicular to the waveguide direction. The waveguide slot includes at least two opposite sides that are in contact with the waveguide core to form a slot waveguide and a terminal end that is in contact with a part of the waveguide core without a tapered structure between the part of the waveguide core and the slot waveguide to couple light between the slot waveguide and the waveguide core.

In yet another implementation, an optical waveguide device is provided to include a first optical waveguide including a first waveguide core made of a first dielectric material and a first waveguide cladding made of a second dielectric material and in contact with the first waveguide core to guide light along a waveguide direction; and a second optical waveguide including a second waveguide core made of the first dielectric material, a second waveguide cladding made of the second dielectric material and in contact with the second waveguide core, and a waveguide slot that is formed in the second waveguide core and made of a waveguide slot dielectric material having a refractive index less than a refractive index of the second waveguide core. The waveguide slot is elongated along the waveguide direction to have a dimension of less than one wavelength of the guided light along a direction perpendicular to the waveguide direction. The first and second optical waveguides are concatenated in series so that a terminal end of the waveguide slot in the second optical waveguide is in contact with a first end facet of two end facets of the first waveguide core of the first optical waveguide to couple light without a tapered waveguide section between the first and second optical waveguides.

These and other implementations and features are described in greater detail in the figures, the detailed description and the claims.

DETAILED DESCRIPTION

Figure 1A:
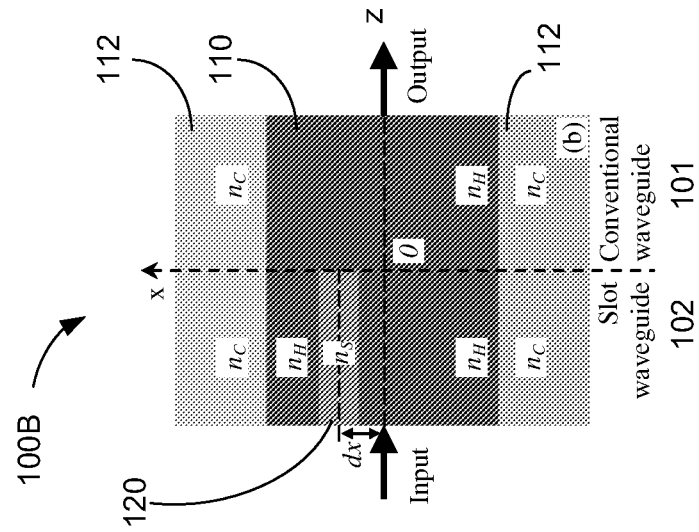
FIGS. 1A and 1B show examples of optical waveguide devices based on direct end-to-end coupling between a slot waveguide and another waveguide.

Slot waveguides can provide high optical confinement and field enhancement in a nanoscale low-index layer which can be located between two high-index layers and has a dimension of less than one wavelength of the guided light along a direction perpendicular to the waveguide direction. This dimension of the slot along the direction perpendicular to the waveguide direction is much less than the dimension of a waveguide core of another optical waveguide in a non-slot configuration. As such, there is a significant difference in the cross sectional fundamental modal field profiles of the slot waveguide and the other waveguide, when the transverse electric field component is perpendicular to the discontinuity interface of refractive index between the low-index slot and the high-index layers. A common practice in waveguide coupling between two optical waveguides with different cross sectional dimensions is to use a tapered waveguide section with one end matching the cross section of one of the two optical waveguides and another end matching the cross section of the other to provide an optically adiabatic mode transformation. This tapered waveguide structure must be long enough to achieve adiabatic conversion from a wide structure to a narrow structure or vice versa and, if the length of the tapered structure is too small, the coupling efficiency can be significantly reduced. Such an adiabatic tapered structure can limit the degree of integration, and may further result in additional losses due to any possible fabrication imperfections in the tapered structure.

The examples of coupling structures between a slot waveguide and another waveguide described in this document use a direct end-to-end coupling and integration between a slot waveguide and another waveguide for efficiently coupling light, without the use of tapered structures. An end-to-end coupling has been used in some optical coupling designs for coupling two waveguide structures that have similar or identical cross sectional modal field profiles along the direction perpendicular to the waveguide direction. In the present direct end-to-end coupling between a slot waveguide and another optical waveguide, the cross sectional modal field profiles of the slot and the other waveguides are very different, e.g., the light confined in the high-index waveguide core layer of a non-slot waveguide can have a Gaussian-like profile while the light in the nanoscale low-index slot layer of the slot waveguide has a non-Gaussian cross sectional profile. This modal field mismatch between the two waveguides would negate the use of the end-to-end coupling based on the well-established condition of having two waveguide structures with similar or identical cross sectional modal field profiles for the end-to-end coupling in the field of optical waveguides.

The research conducted for the present direct end-to-end coupling between a slot waveguide and another waveguide without the use of tapered structures suggested that an efficient direct end-to-end coupling can be achieved when the two waveguides use the same materials and have properly designed dimensions. To a certain extent, a slot waveguide can be treated as two parallel non-slot waveguides spaced by the slot layer. As an example, in an optical slot waveguide that includes a nanoscale slot layer with a refractive index of $n_S$ sandwiched between two high-index core layers with a refractive index of $n_H$ greater than $n_S$ and two low-index cladding layers each with a refractive index of $n_C$ less than $n_H$ outside the two high-index core layers, each of the two parallel non-slot waveguides is formed by the high-index layer ($n_H$) as the waveguide core in the middle, the slot layer ($n_S$) being one cladding layer on one side and the associated low-index cladding layer ($n_C$) being the other cladding layer on the other side. In this simplified model, the fundamental mode of the slot waveguide may be treated as a mode formed by the overlapping of the fundamental modes of the two parallel non-slot waveguides. The fundamental mode of each non-slot waveguides is associated with the total internal reflection (TIR) at the boundary between the low-index cladding layer ($n_C$) and the high-index layer ($n_H$). The fundamental mode of the other waveguide in the end-butt coupling with the slot waveguide is also associated with the total internal reflection (TIR) at the boundary between the low-index cladding layer ($n_C$) and the high-index layer ($n_H$). If both waveguides use the same materials and same dimension for the boundary between the low-index cladding layer ($n_C$) and the high-index layer ($n_H$), the beam propagating in one waveguide may be efficiently transferred to the other one at a high efficiency without having a tapered coupling structure to simplify the coupling structure and shorten the overall size of the coupled structure with the two waveguides.

FIG. 1A shows an example 100A of an optical waveguide device implementing the above direct end-to-end coupling between a slot waveguide and another waveguide. In this example, the optical waveguide device 100A includes a waveguide core 110 made of a dielectric material and a waveguide cladding 112 made of a different dielectric material with a refractive index ($n_C$) less than that ($n_H$) of the waveguide core 112. The waveguide cladding 112 is in contact with at least two opposite sides of the waveguide core 110 and may be formed on more than two sides of the core 110, e.g., the core 110 may be completely surrounded by the cladding 112. The waveguide cladding 112 and the waveguide core 110 are structured to form an optical waveguide to guide light along a waveguide direction of the optical waveguide 101. The axis 111 represents the center symmetric line of the optical waveguide device 100A and is parallel to the waveguide direction.

The waveguide core 110 includes a portion on the right-hand side that is shaped to include a waveguide slot 120 made of a waveguide slot dielectric material having a refractive index ($n_S$) less than that ($n_H$) of the waveguide core 110 and is elongated along the waveguide direction 111 (z direction) to have a dimension of less than one wavelength of the guided light along a direction (e.g., the x-axis direction) perpendicular to the waveguide direction 111. The presence of the waveguide slot 120 divides the entire structure into a first section 101 where the waveguide core 110 is a contiguous mass of the same dielectric material in contact with the waveguide cladding 112 as a "conventional" waveguide, and a second section 102 where the waveguide slot 120 is present to form a slot waveguide. The waveguide slot 120 includes at least two opposite sides that are in contact with the waveguide core 110 and may be surrounded by the waveguide core 110. Hence, the waveguide core 110, the waveguide slot 120 and the cladding 112 form a slot waveguide 102. Notably, a terminal end facet 122 of the slot 120 is in contact with a part of the waveguide core 110 without a tapered structure between the part of the waveguide core 110 and the slot waveguide 102. This forms the direct end-to-end coupling to couple light between the slot waveguide 102 and the waveguide core of the waveguide 101.

In operation, the device 100A receives input light from the side of the waveguide 101 and couples the light into the slot waveguide 102. Alternatively, as shown by a similar structure in FIG. 1B, an optical waveguide device 100B can be used to receives input light from the slot waveguide 102 and outputs the light via the waveguide 101.

Figure 1B:
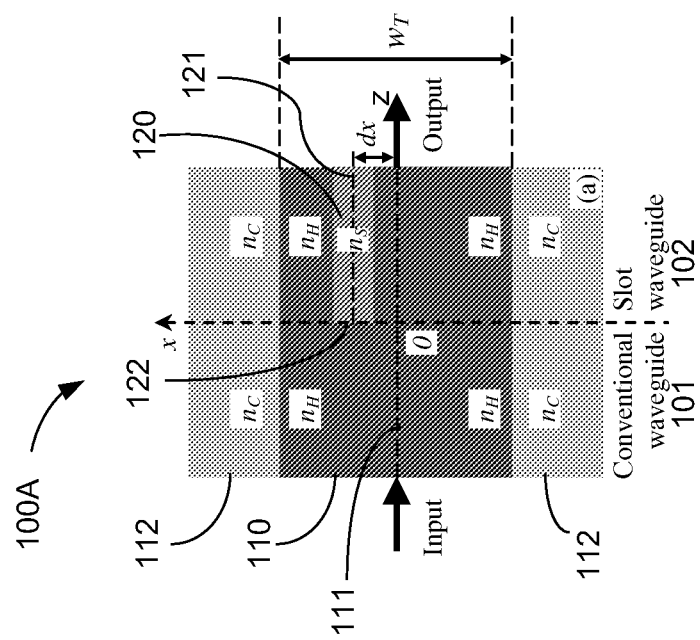

The devices in both FIGS. 1A and 1B have the width of the waveguide core 110 to be the same as the width $w_T$ of the slot waveguide 102, i.e., the sum of the width of the two high-index layers 110 and the low-index slot layer 120. The refractive index of the waveguide core of the waveguide 110 is same as $n_H$, the refractive index of the high-index material in contact with the low-index waveguide slot 120. Both waveguides 101 and 102 use the same cladding material 112. In some implementations, $w_T$ may be in the range of a few hundred nanometers. The refractive index contrast between the core 110 and cladding 112 of the waveguide 101 can be set at a relatively high value to enhance the confinement of the waveguide 101. Optical reflection can occur at the interface 122 and is expected to be low because the cross section of the narrow slot 120 is small.

In FIGS. 1A and 1B, the waveguide slot 120 may be located at the center of the optical waveguide device and may be at an off-center position represented by an offset dx along the x-axis perpendicular to the waveguide direction 111. The position offset dx for the waveguide slot 120 may be caused by inaccuracy in the fabrication or manufacturing process and may also be a result of a specific design. When dx=0, the slot waveguide 102 is a symmetric structure. The coupling efficiency tends to decrease as the offset dx increases but the amount of the decrease in the coupling efficiency is relatively small when dx is small, e.g., tens of nanometers. This property of the devices 100A and 100B provides a tolerance in the device performance to the manufacturing to manufacturing errors.

The devices 100A and 100B can be formed on a substrate which may be made of a semiconductor material or a suitable substrate material. Over this substrate, the waveguide core, the waveguide cladding and the waveguide slot are formed by a fabrication process in a monolithic configuration. The waveguide core 110 may include a core layer formed on the substrate, and the waveguide cladding 112 includes a first waveguide cladding layer formed between the core layer and the substrate and a second waveguide cladding layer formed above the core layer.

The performance of the device 100A or 100B can be evaluated. The finite-difference time-domain (FDTD) method was used to analyze these structures. In simulation, a mesh size of 2.5 nm in both x and z directions is used, the total propagation length is 2 um, 1 um in each waveguide; the input is the fundamental mode; silicon is chosen to be the high-index material ($n_H$=3.48), and silica is chosen to be the low-index material for both the slot and cladding ($n_S$=$n_C$=1.44); the wavelength is 1550 nm. The width of the slot $w_S$ was set to 50 nm, and optimized the confinement of the symmetric slot waveguide by setting dx=0. Under these conditions, the optimal value for $W_T$ is 330 nm, which was used in the FDTD simulation.

Figures 2A, 2B:
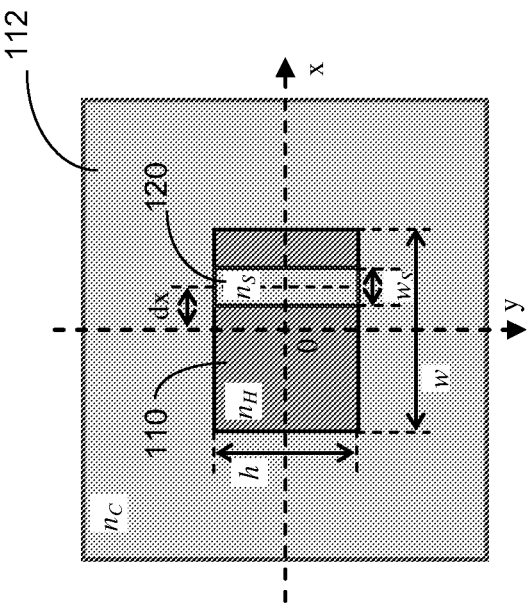
FIGS. 2A and 2B show an example of an optical waveguide devices based on direct end-to-end coupling between a slot waveguide and another waveguide used in computer simulation.

FIG. 2A shows a 3D perspective view of a direct end-to-end coupling structure used in the simulation. FIG. 2B shows the cross-section (perpendicular to the propagation direction z) of the slot waveguide. In the simulation, the cross-section of the waveguide 101 is similar to that of the slot waveguide 102 but without the slot layer.

Figure 3:
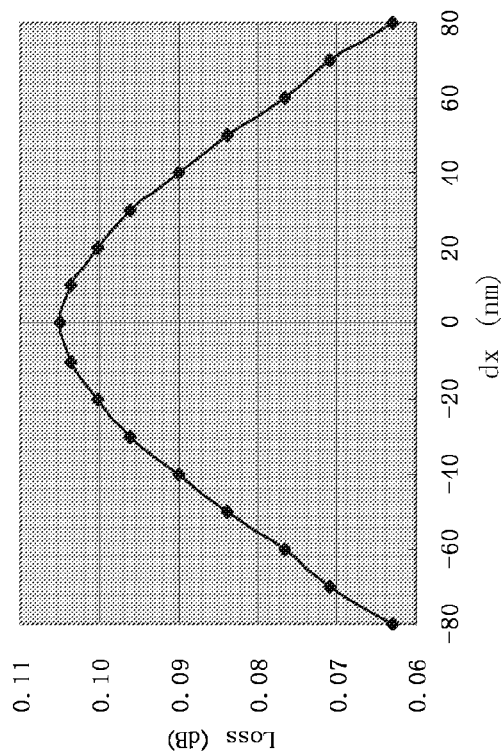
FIG. 3 shows simulation of the propagation loss of the direct couplers as a function of the offset dx of the slot in the slot waveguide.

FIG. 3 shows the dependence of the propagation loss on dx, the offset of the slot layer to the center of the waveguide as shown in FIGS. 1A and 1B. The simulation suggests that the losses introduced by the interface ranges from 0.033 dB to 0.071 dB (efficiency range from 99.3% to 98.4%) when dx ranges from −80 nm to 80 nm. Note that the maximum loss is at dx=0 which is corresponding to a symmetric case, which justifies our analysis that the reflection loss might be the main contributor to the coupling loss. The rather slow change in the loss curve in FIG. 3 over a large dx range (160 nm) shows the coupling loss is not very sensitive to the symmetricity of the slot waveguide. This means the proposed structure has good manufacturing tolerance. Our results further demonstrate that, in comparison with coupling by a tapered structure, the efficiency of the present direct end-to-end coupling is reduced by an insignificant amount, e.g., less than 2%.

Figure 4:
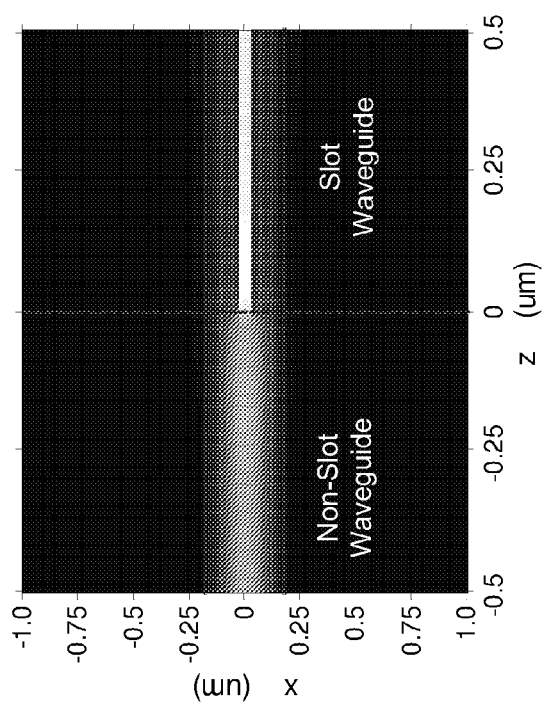
FIG. 4 shows simulation of the light propagation from a conventional waveguide to a slot waveguide.

FIG. 4 shows the light power propagation from the conventional waveguide side to the slot waveguide for the symmetric case at y=0. The data in FIG. 4 suggests that the transition from the conventional waveguide to the slot waveguide is smooth and the coupling efficiency attains 97.61% calculated using mode overlap integral. Hence, the additional length of waveguide may not be required for high efficiency coupling, which leads to higher integration density than the taper based couplers. Because this structure is reciprocal, the light propagation from the slot waveguide to the conventional waveguide can be visualized simply by swapping the two waveguide sections.

Figure 5:
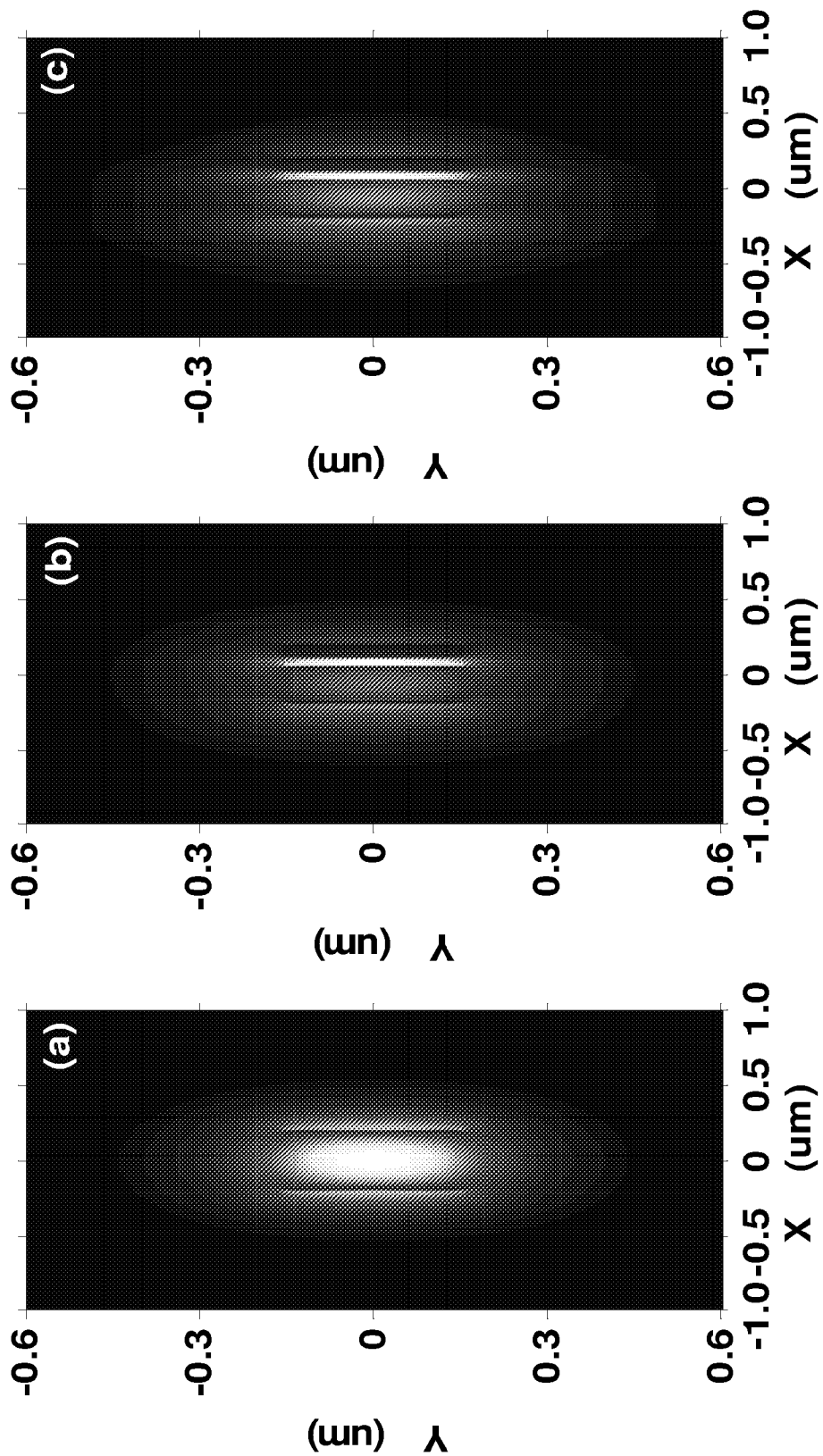
FIG. 5 shows the electric field (Ex) profile of the quasi-TE fundamental mode of (a) the conventional waveguide and (b) the slot waveguide with dx=80 nm; (c) the output electric field (Ex) profile at z=0.5 um obtained using the FDTD method for the coupling from the conventional waveguide to the slot waveguide (with dx=80 nm).

The effective indices of the quasi-TE fundamental mode of the slot waveguides at different values for the offset dx using a finite element method (FEM) based mode solver. These ranged from 1.8024 to 1.9679 when dx is from 0 to 80 nm, and the effective index of the quasi-TE fundamental mode of the conventional waveguide was 2.4779. In order to further show the effectiveness of our design, FIGS. 5 (a), (b) and (c) show contour plots of the electrical field (Ex) profile of respectively, the quasi-TE fundamental mode of the conventional waveguide, the slot waveguide with dx=80 nm, and the electric field (Ex) output (with dx=80 nm) at z=0.5 um obtained using the FDTD method for the coupling from the conventional waveguide to the slot waveguide. It can be seen that the simulated electric field profile in the slot waveguide at z=0.5 um coupled from the conventional waveguide, shown in FIG. 5(c), is very similar to the quasi-TE fundamental Eigenmode of the slot waveguide shown in FIG. 5(b). The similarity of these two electric field profiles is 98.5% in terms of modal overlap. This level of high similarity holds well for all the studied case of dx from −80 nm to 80 nm. The results from FIG. 5 combined with FIG. 3 demonstrate that the light is effectively coupled from the conventional strip waveguide into the slot waveguide, and the significant shape difference between the input and output electric fields does not hinder the mode coupling in the present direct end-to-end coupling for the slot waveguide.

To a certain extent, the beam propagation in the present coupler can be considered to be as occurring in a single conventional waveguide, with part of the beam propagation being perturbed by a nanoscale low index slot. This perturbation does not significantly change the power carried by the light propagation, but the large index discontinuity between the low-index slot and the high-index layers of the slot waveguide changes the field profile drastically when the polarization of the electric field is normal to the discontinuity interface, i.e. when the electric field is the quasi-TE mode. We have verified using the FDTD method that the same perturbation, or the same slot changes both the power and the field profile only negligibly for the quasi-TM light for which the polarization of the electric field is in parallel to the discontinuity interfaces, because, for example, the mode overlap between the quasi-TM fundamental mode of the conventional and slot waveguides studied in Section 2 is 97.32% for the case of dx=0. This also serves as a good support to our analysis and simulations.

Figure 6:
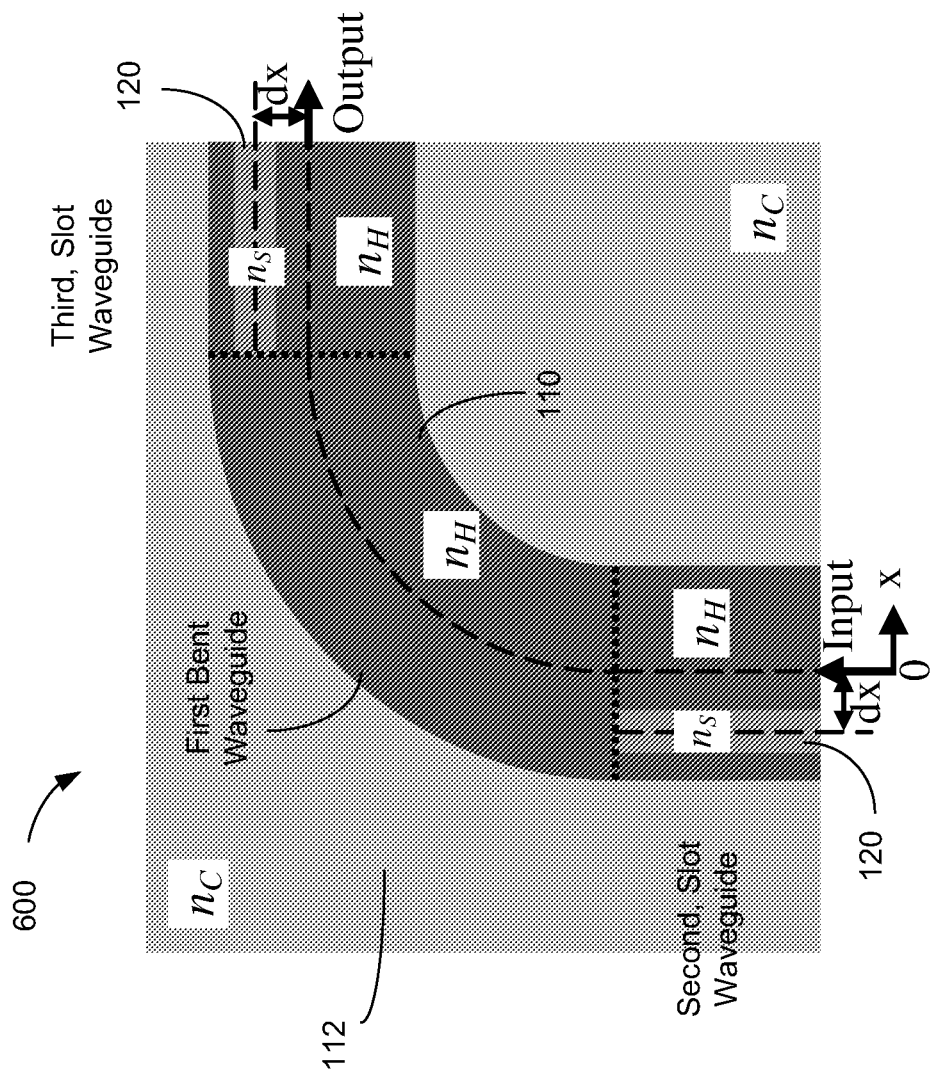
FIG. 6 shows an example of a hybrid 90 degree circular bend for slot waveguide.

FIG. 6 shows another example of an optical waveguide device with a bend waveguide and two slot waveguides. This device 600 includes a first bent optical waveguide including a high-index waveguide core 110 made of a first dielectric material and a first waveguide cladding 112 made of a dielectric material and in contact with the first waveguide core to guide light along a waveguide direction. This bent optical waveguide is curved or bent and the guided light at a second end facet of the first optical waveguide is at a direction different from a direction of the guided light at the first end facet of the first optical waveguide. A second slot waveguide is provided and includes a second waveguide core made of the first dielectric material, a second waveguide cladding made of the second dielectric material and in contact with the second waveguide core, and a waveguide slot that is formed in the second waveguide core and made of a waveguide slot dielectric material having a refractive index less than a refractive index of the second waveguide core. The waveguide slot is elongated along the waveguide direction to have a dimension of less than one wavelength of the guided light along a direction perpendicular to the waveguide direction. The first and second optical waveguides are concatenated in series so that a terminal end of the waveguide slot in the second optical waveguide is in contact with a first end facet of two end facets of the first waveguide core of the first optical waveguide to couple light without a tapered waveguide section between the first and second optical waveguides. The device 600 also includes a third, slot waveguide that includes a third waveguide core made of the first dielectric material and having a same cross section as the first waveguide core, a third waveguide cladding made of the second dielectric material and having a same cross section as the first waveguide cladding, and a waveguide slot that is formed in the third waveguide core and made of a waveguide slot dielectric material having a refractive index less than a refractive index of the third waveguide core. Like the second, slot waveguide, the waveguide slot in the third optical waveguide is elongated along a waveguide direction of the third optical waveguide to have a dimension of less than one wavelength of the guided light along a direction perpendicular to the waveguide direction. The first and third optical waveguides are concatenated in series so that a terminal end of the waveguide slot in the third optical waveguide is in contact with a second end facet of the two end facets of the first waveguide core of the first optical waveguide to couple light without a tapered waveguide section between the first and third optical waveguides.

The example device in FIG. 6 is a hybrid 90-degree circular bend for slot waveguides. A conventional waveguide with high refractive index difference between the core and cladding as the bend can be used in FIG. 6 to connect two slot waveguides. The device in FIG. 6 provides a slot waveguide to conventional waveguide coupler at the input port, and a conventional waveguide to slot waveguide coupler at the output port. The following parameters were used in simulations: $n_H$=3.48, $n_S$=$n_C$=1.44, wavelength=1550 nm, radius of the bend (the dashed line)=1 um, and length of both the input and output slot waveguides=1 um. The slot width $w_S$ is again 50 nm, and the optimal $w_T$ is therefore 330 nm.

Figure 7:
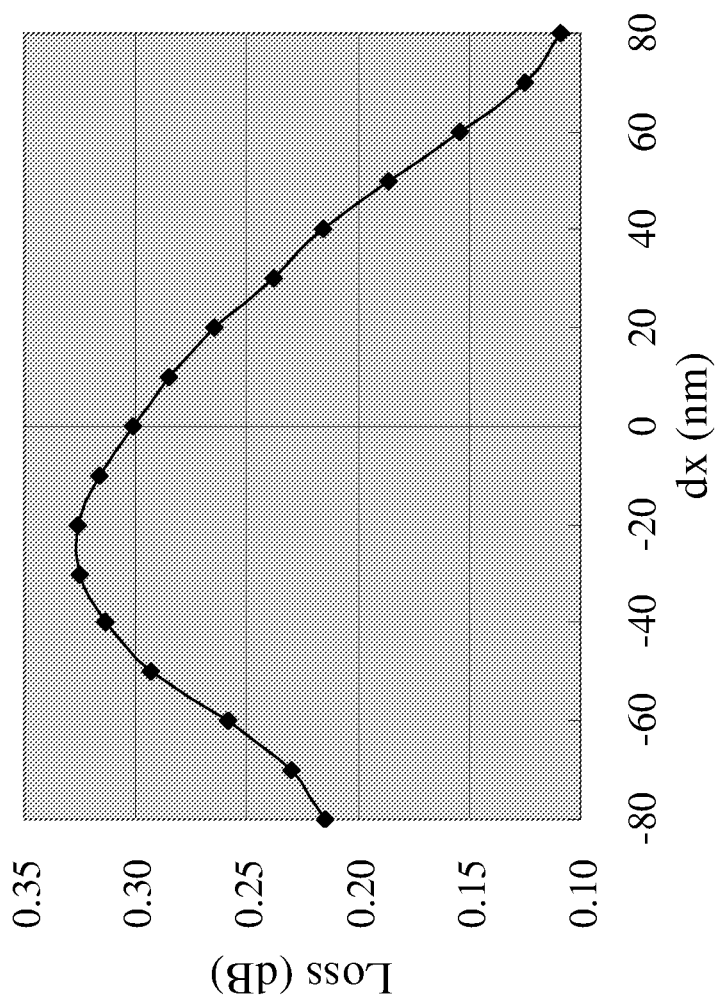
FIG. 7 shows simulation of the propagation loss of the direct coupler as a function of the offset dx of the slot in the slot waveguide in the device in FIG. 6.

FIG. 7 shows the dependence of the overall loss, consisting of the coupling losses between the conventional waveguide and the two slot waveguides and the bending loss, on dx in the range from −80 nm to 80 nm. As can be seen, the curve is not symmetric but skewed toward the negative dx side, and the overall loss reaches its maximum at dx around −25 nm. The overall loss is only in a range from 0.1 dB to 0.35 dB, which is low and relatively flat over the large studied range of dx (160 nm), showing that the overall coupling loss of the proposed circular bend structure is not appreciably sensitive to the symmetricity of the slot waveguide, and thus has good manufacturing tolerance. Finally, we point out that the two slot waveguides in the hybrid circular bend in FIG. 7 can be different in terms of dx and the proposed ideas can be easily applied to 3D slot waveguide structures and multiple-slot waveguide structures Our analysis shows that the proposed couplers have similarly high coupling performance when compared to the taper based coupling methods. Because the direct couplers do not require additional length of waveguide tapers, they also enable higher integration density. Furthermore, our simulations show that the coupling performance for the direct end-to-end couplers is not very sensitive to the symmetricity of the slot waveguide, resulting in decent tolerance with respect to manufacturing variations. Note that the coupler presented here is for a vertical slot waveguide, but the idea can be easily applied to horizontal slot waveguides and multi-slot waveguides. The proposed direct couplers can be used in various applications for slot waveguide based photonic devices due to the excellent coupling performance, easier integration with conventional waveguide optics and higher integration density.

The disclosed direct coupling techniques and waveguide structures can be used for guiding light at various wavelengths, including 1550 nm and other light bands, such as ultraviolet, visible band, and infrared. The high index materials for implementing the disclosed direct coupling waveguide structures can be various materials beyond the described silicon/silica examples, such as high-index semiconductor and other materials (e.g., Germanium, Titanium Dioxide, Gallium Phosphide) and relatively high index polymers. The low-index materials for the waveguide cladding and/or the slot can be various solid materials, a gas. water, biological/chemical liquids, and liquid crystals, and others. Other than the waveguide structures in the examples, the disclosed direct coupling techniques can be applied to other waveguide structures, e.g., multiple-slot waveguides where each slot waveguide has multiple low-index slots, and horizontal and vertical slot waveguides.

While this document contains many specifics, these should not be construed as limitations on the scope of the invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. Variations and enhancements of the described implementations and other implementations can be made based on what is described and illustrated in this document.

What is claimed is:

1. An optical waveguide device, comprising:
   a waveguide core made of a first dielectric material which has a first refractive index; and
   a waveguide cladding in contact with at least two opposite sides of the waveguide core and structured to have each waveguide cladding part, which is in contact with the waveguide core, made of a dielectric material with a refractive index less than the first refractive index, and form an optical waveguide with the waveguide core to guide light along a waveguide direction of the optical waveguide,
   wherein the waveguide core comprises a portion that is shaped to include a waveguide slot, which is made of a second dielectric material having a second refractive index less than the first refractive index of the waveguide core and is elongated along the waveguide direction to have a dimension of less than one wavelength of the guided light along a direction perpendicular to the waveguide direction, and
   wherein the waveguide slot includes at least two opposite sides that are in contact with the waveguide core to form a slot waveguide and a terminal end that is in contact with a part of the waveguide core without a tapered structure between the part of the waveguide core and the slot waveguide to couple light between the slot waveguide and the waveguide core.

2. The device as in claim 1, comprising:
   a substrate on which the waveguide core, the waveguide cladding and the waveguide slot are formed.

3. The device as in claim 2, wherein:
   the waveguide core comprises a core layer formed on the substrate, and the waveguide cladding comprises a first waveguide cladding layer formed between the core layer and the substrate and a second waveguide cladding layer formed above the core layer.

4. The device as in claim 3, wherein:
   the waveguide slot is a rectangular slot formed in the core layer.

5. The device as in claim 1, wherein:
   waveguide slot is centered at a center of the waveguide core along a direction perpendicular to the waveguide direction.

6. The device as in claim 1, wherein:
   the waveguide slot is offset from a center of the waveguide core along a direction perpendicular to the waveguide direction.

7. The device as in claim 1, wherein:
   the waveguide core is surrounded by the waveguide cladding along each direction perpendicular to the waveguide direction.

8. The device as in claim 1, wherein:
   the waveguide slot is surrounded by the waveguide core along each direction perpendicular to the waveguide direction.

9. The device as in claim 1, wherein:
   the waveguide core is a silicon core; and
   the waveguide cladding and the waveguide slot arc made of silica.

10. The device as in claim 1, wherein:
    the waveguide core includes a semiconductor material.

11. The device as in claim 1, wherein:
    the waveguide core includes a polymer material.

12. The device as in claim 1, wherein:
    the waveguide core includes titanium dioxide.

13. The device as in claim 1, wherein:
    the waveguide cladding includes a gas.

14. The device as in claim 1, wherein:
    the waveguide cladding includes a liquid.

15. An optical waveguide device, comprising:
    first optical waveguide including a first waveguide core made of a first dielectric material and a first waveguide cladding made of a second dielectric material and in contact with the first waveguide core to guide light along a waveguide direction; and
    a second optical waveguide including a second waveguide core made of the first dielectric material, a second waveguide cladding made of the second dielectric material and in contact with the second waveguide core, and a waveguide slot that is formed in the second waveguide core and made of a waveguide slot dielectric material having a refractive index less than a refractive index of the second waveguide core, the waveguide slot being elongated along the waveguide direction to have a dimension of less than one wavelength of the guided light along a direction perpendicular to the waveguide direction,
    wherein the first and second optical waveguides are concatenated in series so that a terminal end of the waveguide slot in the second optical waveguide is in contact with a first end facet of two end facets of the first waveguide core of the first optical waveguide to couple light without a tapered waveguide section between the first and second optical waveguides.

16. The device as in claim 15, wherein:
    the waveguide slot is centered at a center of the second waveguide core along a direction perpendicular to the waveguide direction.

17. The device as in claim 15, wherein:
the waveguide slot is offset from a center of the second waveguide core along a direction perpendicular to the waveguide direction.

18. The device as in claim 15, wherein:
the first and second waveguide cores are made of silicon; and
the first waveguide cladding, the second waveguide cladding and the waveguide slot are made of silica.

19. The device as in claim 15, wherein:
the first optical waveguide is curved and the guided light at a second end facet of the first optical waveguide is at a direction different from a direction of the guided light at the first end facet of the first optical waveguide; and
the device comprises a third optical waveguide that comprises a third waveguide core made of the first dielectric material and having a same cross section as the first waveguide core, a third waveguide cladding made of the second dielectric material and having a same cross section as the first waveguide cladding, and a waveguide slot that is formed in the third waveguide core and made of a waveguide slot dielectric material having a refractive index less than a refractive index of the third waveguide core, the waveguide slot being elongated along a waveguide direction of the third optical waveguide to have a dimension of less than one wavelength of the guided light along a direction perpendicular to the waveguide direction;
wherein the first and third optical waveguides are concatenated in series so that a terminal end of the waveguide slot in the third optical waveguide is in contact with a second end facet of the two end facets of the first waveguide core of the first optical waveguide to couple light without a tapered waveguide section between the first and third optical waveguides.

20. The device as in claim 19, wherein:
the first optical waveguide is curved and the guided light at a second end facet of the first optical waveguide is at a direction that is 90 degrees from a direction of the guided light at the first end facet of the first optical waveguide.

21. The device as in claim 15, wherein:
the first dielectric material includes a semiconductor material.

22. The device as in claim 15, wherein:
the first dielectric material includes a polymer material.

23. The device as in claim 15, wherein:
the waveguide core includes titanium dioxide.

24. The device as in claim 15, wherein:
the waveguide cladding includes a gas.

25. The device as in claim 15, wherein:
the waveguide cladding includes a liquid.

26. A method for coupling an optical slot waveguide to an optical waveguide, comprising:
providing an optical waveguide that comprises a first waveguide core and a first waveguide cladding in contact with the first waveguide core to guide light along a waveguide direction;
providing an optical slot waveguide that comprises a second waveguide core and a second waveguide cladding that are respectively identical to the first waveguide core and the first waveguide cladding of the optical waveguide in material composition and in structure, and a waveguide slot that is formed in the second waveguide core and made of a waveguide slot dielectric material having a refractive index less than a refractive index of the second waveguide core, the waveguide slot being elongated along the waveguide direction to have a dimension of less than one wavelength of the guided light along a direction perpendicular to the waveguide direction; and
concatenating the optical slot waveguide and the optical waveguide in series to be in contact with each other so that a terminal end of the waveguide slot in the optical slot waveguide is in contact with an end facet of the waveguide core of the optical waveguide to couple light without a tapered waveguide section between the optical waveguide and the optical slot waveguide while the first waveguide core and the first waveguide cladding of the optical waveguide mate with the second waveguide core and the second waveguide cladding of the optical slot waveguide, respectively.

27. The method as in claim 26, comprising:
directing light from the optical waveguide into the optical slot waveguide.

28. The method as in claim 26, comprising:
directing light from the optical slot waveguide into the optical waveguide.

* * * * *